United States Patent
Noble, Jr.

(10) Patent No.: US 7,587,040 B2
(45) Date of Patent: Sep. 8, 2009

(54) SYSTEMS AND METHODS FOR DETECTING FALSE SIGNALS ON AN OUTBOUND CALL

(75) Inventor: James K. Noble, Jr., Marietta, GA (US)

(73) Assignee: Noble Systems Corporation, Atlanta, GA (US)

( * ) Notice: Subject to any disclaimer, the term of this patent is extended or adjusted under 35 U.S.C. 154(b) by 790 days.

(21) Appl. No.: 11/289,869

(22) Filed: Nov. 30, 2005

(65) Prior Publication Data

US 2006/0256929 A1   Nov. 16, 2006

Related U.S. Application Data

(60) Provisional application No. 60/681,257, filed on May 16, 2005.

(51) Int. Cl.
*H04M 3/00* (2006.01)
*H04M 5/00* (2006.01)
*H04M 1/00* (2006.01)

(52) U.S. Cl. .................. 379/257; 379/251; 379/377

(58) Field of Classification Search .......... 379/251, 379/257, 210.02, 377, 378, 381, 384, 386, 379/266.07, 266.08
See application file for complete search history.

(56) References Cited

U.S. PATENT DOCUMENTS

| | | | |
|---|---|---|---|
| 5,371,787 A | 12/1994 | Hamilton | |
| 5,436,965 A | 7/1995 | Grossman et al. | |
| 5,581,602 A | 12/1996 | Szlam et al. | |
| 5,633,922 A | 5/1997 | August et al. | |
| 5,724,420 A | 3/1998 | Torgrim | |
| 5,809,128 A | 9/1998 | McMullin | |
| 5,828,731 A | 10/1998 | Szlam et al. | |
| 6,208,970 B1 | 3/2001 | Ramanan | |
| 6,226,360 B1 | 5/2001 | Goldberg et al. | |
| 6,233,319 B1 | 5/2001 | Cox et al. | |
| 6,324,262 B1 | 11/2001 | Tuttle | |
| 6,546,097 B1 | 4/2003 | Peltz | |
| 6,633,639 B1 | 10/2003 | Ludford | |
| 6,744,881 B1 | 6/2004 | Price | |
| 6,775,364 B2 * | 8/2004 | Knox | 379/361 |

(Continued)

FOREIGN PATENT DOCUMENTS

WO   WO 2003/028356 A1   4/2003

*Primary Examiner*—Quoc D Tran
(74) *Attorney, Agent, or Firm*—Sutherland Asbill & Brennan LLP

(57) ABSTRACT

Systems and methods for detecting false signals on a telephone line. The devices provide an additional verification for outbound calls which result in a disconnected or not in service signal that such signals are valid and not false tones being emitted by a device or service employed by the call recipient, The type of additional verification of the outbound call is dependent on the telephone network on which the outbound call is placed. For example, on an analog telephone network a drop in loop current may be detected indicting a connected call which is contrary to the disconnected or not in service signals being received. Such connected signals can be detected on digital networks by monitoring dedicated control data channels or through the use of data received through the use of in-band signaling. Once the additional verification had detected false tones the call can be process as if a connection occurred including routing such calls to an available agent or other handling process customized to handle such calls.

20 Claims, 2 Drawing Sheets

U.S. PATENT DOCUMENTS

| | | |
|---|---|---|
| 6,782,358 B2 | 8/2004 | Cox et al. |
| 6,826,529 B1 | 11/2004 | Zhang et al. |
| 6,850,602 B1 | 2/2005 | Chou |
| 7,266,183 B1 * | 9/2007 | Jones, IV .................. 379/88.25 |
| 2002/0085686 A1 | 7/2002 | Cullis |
| 2004/0114747 A1 | 6/2004 | Trandal et al. |
| 2004/0179672 A1 | 9/2004 | Pagel et al. |
| 2005/0074114 A1 * | 4/2005 | Fotta et al. .............. 379/266.08 |
| 2006/0256945 A1 * | 11/2006 | Noble, Jr. .............. 379/211.02 |

* cited by examiner

SYSTEMS AND METHODS FOR DETECTING FALSE SIGNALS ON AN OUTBOUND CALL

RELATED APPLICATIONS

The present application claims priority to U.S. Provisional Patent Application Ser. No. 60/681,257, filed May 16, 2005, which is hereby incorporated by reference as if set forth fully herein.

FIELD OF THE INVENTION

The invention is related to the field of telephony and communications. More particularly, the invention relates to automated call distribution technology.

BACKGROUND OF THE INVENTION

Existing technologies that automatically place outbound telephone calls, such as predictive dialing systems, are used by many companies to greatly improve the efficiency of their agents. Such systems are used by telemarketing companies, market research companies, and are heavily used by companies making collection calls. Such systems rely on hardware and/or software to determine the result of an outbound placed call. It is desirable that the system know the difference between a human answer, an answering machine, a busy signal, and a disconnected or not in service number recording in order to send only human answered calls to agents. The primary method for detecting that a call is being placed to a disconnected or not in service number is monitoring the line for the distinctive "tones" received or detected prior to the disconnected or not in service recordings. The frequency of these tones can be detected and the call can then be classified as disconnected or not in service.

Recently devices have been marketed to the general public, which are placed on their telephone line that falsely transmit the "tones" normally transmitted by the telephone network to signify a disconnected or not in service number. One such device is known as the Telezapper®, sold commercially by Privacy Technologies, Inc, a wholly owned subsidiary of Royal Appliance Manufacturing Co., a corporation located in the state of Ohio. While such devices have been marketed with the intent of stopping unwanted telemarketing calls, their use has caused problems for anyone placing calls to such telephone lines for legitimate business purposes such as to collect a debt owed by a person at the called number, or calls from companies with which the person has an existing business relationship, in which cases the called person may indeed wish to receive the call. Thus, there is an unsatisfied need for properly distinguishing between false tones transmitted by such devices and the valid tones sent by the telephone network.

SUMMARY OF THE INVENTION

The present invention is directed to systems and methods for detecting false signals on a telephone line. A method in accordance with an embodiment of the present invention includes the steps of placing an outbound call on a telephone line, monitoring the telephone line for a detection of a service tone and for a call connected signal. The monitoring can be performed in a variety of ways and may include monitoring for a drop in loop current on the telephone line, monitoring in-band signals for a signal indicative of a call connected signal, monitoring channel associated signals for a signal indicative of a call connected signal, or acquiring a signal from the control channel indicative of a call connected signal. When both a service tone and connected signal are detected in response to the outbound call, then the call is processed as a false service tone call. A false service tone call can be processed in a variety of ways including routing the call to an agent, playing a message on the telephone line or processing the call in substantially the same manner as a connected call. In accordance with an aspect of the present invention a service tone may be a disconnected service tone or a not in service tone.

The present invention is also directed to a call center for placing outbound calls which includes a predictive dialer, one or more processor that detect a service tone, detect a call connected signal, and determine when both detections have occurred on the same call, one or more interfaces that connect the call center to a telephone network and route calls to one or more agents that are connected to the call center at least in part on when both a service tone and a call connected signal are detected on the same call. Additionally, the call center also may include, or work in conjunction with, a router that routes a call from the call center to an agent based at least in part on when both a service tone and a call connected signal are detected on the same call. In an alternative embodiment of the present invention, the functions of the one or more processors can be performed by the single processor or two or more processors such as the call center's central processing unit, predictive dialer, or dedicated digital signal processors, ASICs, programmable ICs (PICs), etc.

BRIEF DESCRIPTION OF THE DRAWINGS

Figure 1:
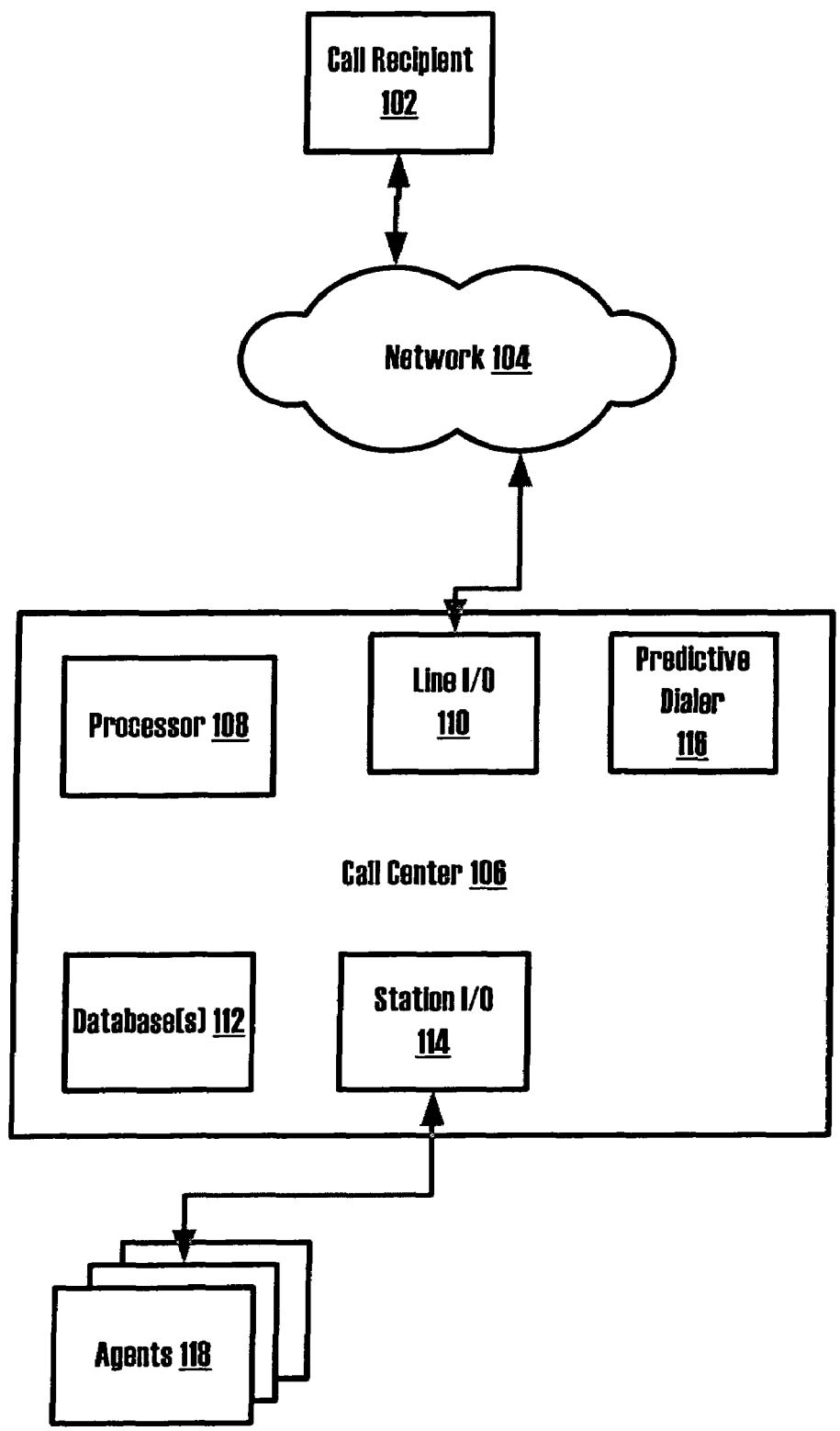

Having thus described the invention in general terms, reference will now be made to the accompanying drawings, which are not necessarily drawn to scale, and wherein:

FIG. 1 is a functional block diagram showing a call center which connects agents to connected call recipients over a network, in accordance with an exemplary embodiment of the present invention.

Figure 2:
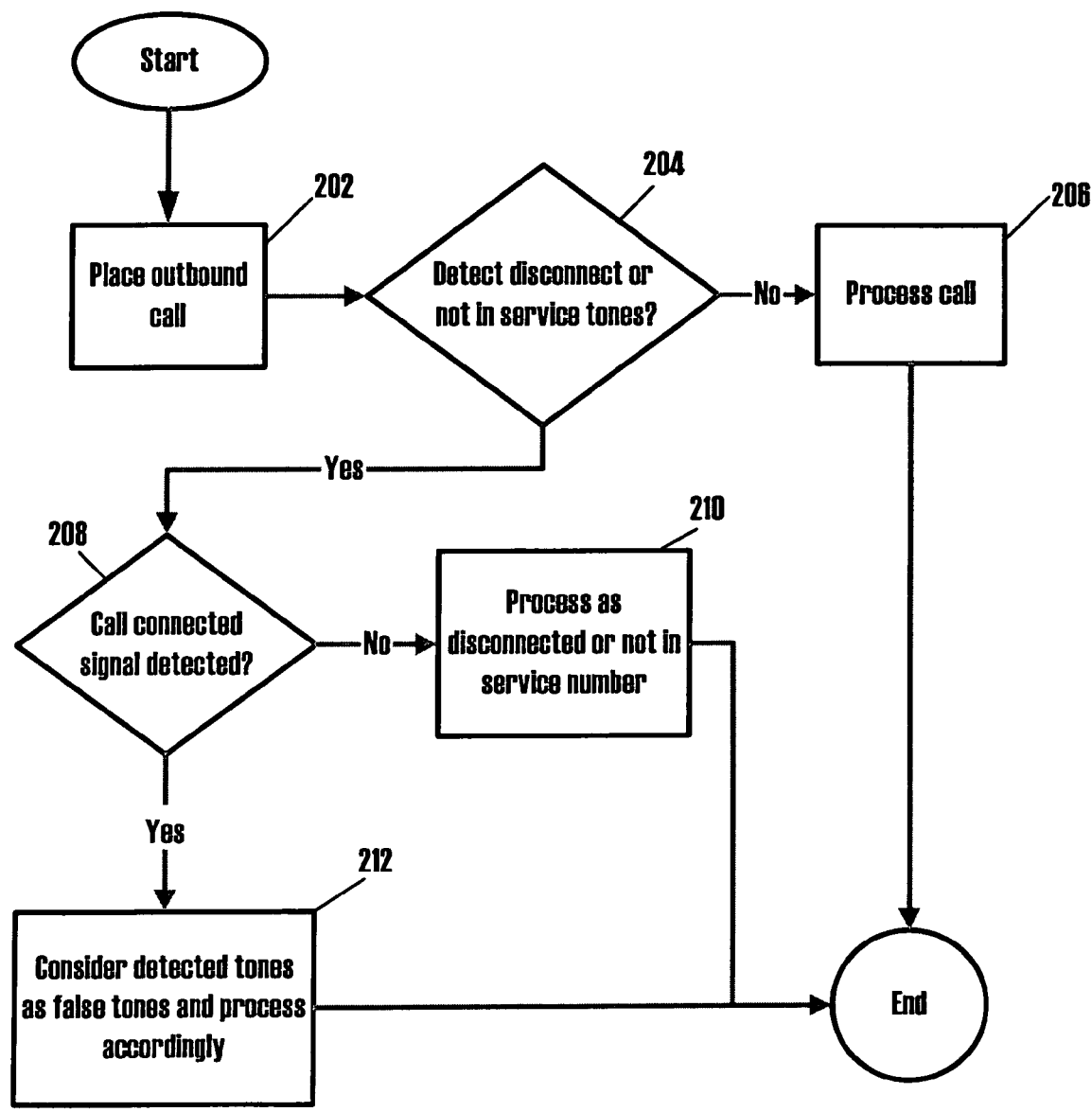

FIG. 2 is a flowchart demonstrating the steps in detecting false tones received over a telephone line, in accordance with an exemplary embodiment of the present invention.

DETAILED DESCRIPTION OF THE PRESENT INVENTION

In accordance with an embodiment of the present invention, an exemplary system for implementing the present invention described below is illustrated in FIG. 1. FIG. 2 shows an exemplary embodiment of a method using the system of FIG. 1 for determining if detected disconnected or not in service tones are authentic or are false tones. The present invention is described below with reference to figures and flowchart illustrations of systems, methods, apparatuses and computer program products according to an embodiment of the invention. It will be understood that each block of the flowchart illustrations, and combinations of blocks in the flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions. The inventions may be implemented through an application program running on an operating system of a computer. The inventions also may be practiced with other computer system configurations, including hand-held devices, multiprocessor systems, microprocessor based or programmable consumer electronics, mini-computers, mainframe computers, etc.

Application programs that are components of the invention may include routines, programs, components, data structures, etc. that implements certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network.

The present invention will now be described more fully hereinafter with reference to the accompanying figures, in which like numerals indicate like elements throughout the several drawings. Some, but not all embodiments of the invention are described. Indeed, these inventions may be embodied in many different forms and should not be construed as limited to the embodiments set forth herein; rather, these embodiments are provided so that this disclosure will satisfy applicable legal requirements, be thorough and complete, and will fully convey the scope of the invention to those skilled in the art.

With reference to FIG. 1, a system in accordance with an embodiment of the present invention includes a call center 106 in communication both with agents 118 and call recipients 102. The call center 106 includes a processor 108 with associated memory such as one or more databases 112, a predictive dialer 116 for automatically placing calls and line interfaces 110 and station interfaces 114 for providing bi-directional communication with call recipients 102 and agents 118, respectively. The call center processor 108 executes software from its associated memory, such as database 112, to control the operations of the control center 106 such as the predictive dialer 116, and the routing of calls between agents 118 and call recipients 102.

In the illustrative embodiment, the database 112 stores computer program code, and the program code can be designed to implement the process described below in connection with FIG. 2. The database 112 may also store call recipient information such as phone numbers, previous call information, statistical data, information related to the subject of a call, etc. The databases 112 can be located with or remote to the call center 106. Further, in an alternative embodiment, one or more of the call center operations can be controlled remotely by a remote server, computer, etc.

The call center 106 uses the interfaces 110 and 114 to connect the call recipients 102 to the agents 118. The line interface 110 connects the predictive dialer 116 to a network 104, and the station interface 114 routes connected outbound calls to one or more agents 118 connected to the call center 106. In an alternative embodiment of the present invention, a router, located within or remote from the call center 106 may be used to route calls directly from the line interface 110 or predictive dialer 116 to the station interface 114 or directly to the agents 118 themselves. The call center 106 automatically places telephone calls over a network 104, such as the public switch telephone network (PSTN), cellular network, Internet, etc. through the use of one or more predictive dialers 116. The placed telephone calls can be transmitted over analog transmission lines, digital transmission lines, or both. It is also understood that such calls can be transmitted over a Voice over IP (VoIP) network. A predictive dialer 116 initiates a call and its associated hardware (e.g., a digital signal processor) monitors the progress of the call (e.g., connection to a person, connection to a machine, busy signal, no connection, or service tones such as disconnected tones, not in service tones or similar signals, etc.). The hardware used to monitor an initiated call may utilize the call center processor 108, the predictive dialer 116 itself, or hardware associated with the predictive dialer 116 such as dedicated ASIC chip(s), digital signal processor(s), PIC processors or an associated monitoring device controlled by the call center processor 108 as well as analog-to-digital and digital-to-analog converters depending on the transmission line being used. The network 104 routes the call to the appropriate call recipient 102. The call center 106 monitors the call over the line interface 110, and when the call center 106 determines that a call should be handled by an live agent it routes the call on the line to an agent 116 by way of the station interfaces 114.

In accordance with an embodiment of the present invention, when the call center 106 has detected that a dialed phone number results in service tones (e.g., disconnected tones, not in service tones, or similar signals), an additional verification is conducted to determine if the detected tones are authentic or false, that is, are they generated by the telephone network or by a device on the called party's line. This false signal detection is provided for by the processor 108, predictive dialer 116, or another processor such as a digital signal processor, dedicated ASIC, or PIC processor located within or remote from the call center 106 located in FIG. 1.

In implementing the false signal detection process, which will be described below with reference to FIG. 2, the call center processor 108 instructs its predictive dialer 116 to utilize the call center line interface 110 to automatically place calls to call recipients 102. The call is then monitored by the call center processor 108, the predictive dialer 116 itself, or hardware associated with the predictive dialer 116 such as dedicated ASIC chip(s), digital signal processor(s), PIC processors or an associated monitoring device controlled by the call center processor 108 for the detection of disconnected or not in service tones. If neither is detected then the call proceeds depending on what is detected (e.g., busy signal, no connection, connection to a person, connection to a machine or service, etc.). If either disconnected or not in service tones are detected, then an additional verification step by checking the telephone line or signals received or detected from a network 104 for a call connected signal. This additional check can be conducted by the predictive dialer 116, hardware associated with the predictive dialer 116 such as dedicated ASIC chip(s) or digital signal processor(s), PIC processors or an associated monitoring device controlled by the call center processor 108. Hence, the detection of both the service tones and the call connected signal can be performed by the same or separate processors.

If a call connected signal or indication is not observed, then the disconnect or not-in-service tones are treated as authentic and the call is processed accordingly. If a call connected signal or indication thereof is observed, then the service tones are treated as false service tones and the call is process accordingly, such as routing the call by the call center processor 108 to an available agent 118 over the station interface 114 for handling, playing a recorded message on the telephone line, or other call servicing that would be appreciated by one of ordinary skill in the art.

FIG. 2 shows an exemplary method for performing the false signal detection in accordance with the present invention. The process begins with step 202, which places an outbound call. Once the call has been placed, step 204 is invoked to monitor the call progress to see if a connection is made or to see if other indications are received or detected such as a busy signals, disconnected signal or not in service signal. These signals are typically in the form of tones detectable by the digital signal processor of the predictive dialer 116 and/or other electronic devices associated with the call center 106. If neither disconnected or not in service tones are detected, then step 206 is invoked to process the call depending on how the call progressed (e.g., answered by a person, answered by a machine, no answer, busy signal, etc.). When tones are received or detected on the telephone line that signify either a disconnected or not in service number, then step 208 is invoked to conduct an additional determination as to whether a call connected signal has been received or detected, for the call placed, indicating that the call has actually been answered and the service tones detected are false service tones.

The detection of a call connected signal can occur in a variety of ways based in part on the type of network (analog or digital) the connection is operating. An example of how a "call connected" signal may be detected on an analog network can be a drop in loop current. In digital networks, a "call connected" signal may be acquired from the control channel in the group of dedicated digital lines being used. The control channel is a data channel that includes flags (or bits) that can be set or switched when a call has been connected. Another example of detecting when a call has been answered on digital networks involves the use of in-band signaling (e.g., allocating bits from the voice data transmission for signaling purposes and monitoring the allocated portion of the transmitted signal to determine if a call had been answered), and/or the use of channel associated signaling (CAS) protocol.

Next, if no signal or notification has been received or detected that would indicate that the call has been answered, then the tones may be presumed to be legitimate tones signifying the number is in fact either disconnected or not in service. In such a case, step 210 is invoked to classify and process the call appropriately (e.g., logging the detection of a disconnect or not in service signal for that particular phone number in a database, etc.).

However, if a call connected signal has been received or detected, then step 212 is invoked and the tones are classified as false tones transmitted by a device at the other end of the line and the call can then be handled as desired, such as based on a predetermined protocol. Examples of how a false signal call can be handled include (1) connecting the call to an available agent in the handling group for which the call was placed, just as one as if the call was answered by a person, (2) connect the call to an agent in a different agent specified group for special handling of these types of calls, (3) play a message on the line, (4) disconnect the call and mark the number and associated records as such for processing at a later time, (5) record the called number in a manner that signifies a false signal has been detected, and well as other suitable protocols for handling such calls. If the call is connected to an agent, then the agent may be notified by an audible whisper or screen interface message that the call resulted in false signals. These and other protocols can be used alone or in combination with one another.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of detecting false signals on a telephone line, comprising:
   placing an outbound call on a telephone line;
   monitoring the telephone line for a detection of a service tone, wherein the service tone is a disconnected tone or a not-in-service tone;
   detecting the service tone;
   after detecting the service tone, determining, by a processor, that the outbound call is connected; and
   upon the detection of a service tone and subsequent determination that the outbound call is connected, processing the outbound call as a false service tone call.

2. The method of claim 1, wherein determining that the outbound call is connected includes monitoring for a drop in loop current on the telephone line.

3. The method of claim 1, wherein determining that the outbound call is connected includes acquiring a signal from the control channel indicative of a call connected signal.

4. The method of claim 1, wherein determining that the outbound call is connected includes monitoring in-band signals for a signal indicative of a call connected signal.

5. The method of claim 1, wherein determining that the outbound call is connected includes monitoring channel associated signals for a signal indicative of a call connected signal.

6. The method of claim 1, wherein processing the call includes routing the call to an agent.

7. The method of claim 1, wherein processing the call includes processing the call in substantially the same manner as a connected call.

8. The method of claim 1, wherein processing the call includes playing a message on the telephone line.

9. A call center for placing outbound calls, comprising:
   a predictive dialer that places outbound calls on a telephone network;
   at least one interface that connects the predictive dialer to a telephone network and routes connected outbound calls to a plurality of agents connected to the call center; and
   at least one processor configured to:
     detect a service tone on an outbound call, wherein the service tone is a disconnected tone or a not-in-service tone, subsequent to detecting the service tone,
determine that the outbound call is connected, and
upon the detection of a service tone and subsequent determination that the outbound call is connected, process the outbound call as a false service tone call.

10. The system of claim 9 further comprising a router that routes a call to an agent based at least in part on when both a service tone has been detected on an outbound call and the outbound call has been determined to be connected.

11. The system of claim 9, wherein the at least one interface includes a station interface that routes connected outbound calls to a plurality of agents connected to the call center and a line interface that connects the predictive dialer to a telephone network.

12. The system of claim 9, wherein the at least one processor includes two or more digital signal processors.

13. A system of detecting false signals on a telephone line, comprising:
at least one interface connecting to a telephone network;
a processor in communication with the at least one interface, wherein the processor is configured to execute computer executable instructions to:
place an outbound call on a telephone line;
monitor the telephone line for a detection of a service tone, wherein the service tone is a disconnected tone or a not-in-service tone;
detect the service tone;
after detecting the service tone, determine that the outbound call is connected; and
upon the detection of a service tone and subsequent determination that the outbound call is connected, process the outbound call as a false service tone call.

14. The system of claim 13, wherein the computer executable instructions to determine that the outbound call is connected include computer executable instructions to monitor for a drop in loop current on the telephone line.

15. The system of claim 13, wherein the computer executable instructions to determine that the outbound call is connected include computer executable instructions to acquire a signal from the control channel indicative of a call connected signal.

16. The system of claim 13, wherein the computer executable instructions to determine that the outbound call is connected include computer executable instructions to monitor in-band signals for a signal indicative of a call connected signal.

17. The system of claim 13, wherein the computer executable instructions to determine that the outbound call is connected include computer executable instructions to monitor channel associated signals for a signal indicative of a call connected signal.

18. The system of claim 13, wherein the computer executable instructions to process the call include computer executable instructions to route the call to an agent.

19. The system of claim 13, wherein the computer executable instructions to process the call include computer executable instructions to process the call in substantially the same manner as a connected call.

20. The system of claim 13, wherein the computer executable instructions to process the call include computer executable instructions to play a message on the telephone line.

* * * * *